US009585075B2

(12) United States Patent
Khoryaev et al.

(10) Patent No.: US 9,585,075 B2
(45) Date of Patent: Feb. 28, 2017

(54) COVERAGE BOOSTING TRANSMISSION METHOD FOR LTE TECHNOLOGY

(71) Applicant: Intel Corporation, Santa Clara, CA (US)

(72) Inventors: Alexey Khoryaev, Nizhny Novgorod (RU); Andrey Chervyakov, Nizhny Novgorod (RU); Jong-Kae Fwu, Sunnyvale, CA (US); Sergey Panteleev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 203 days.

(21) Appl. No.: 14/124,964

(22) PCT Filed: Oct. 18, 2013

(86) PCT No.: PCT/US2013/065599
§ 371 (c)(1),
(2) Date: Dec. 9, 2013

(87) PCT Pub. No.: WO2014/070480
PCT Pub. Date: May 8, 2014

(65) Prior Publication Data
US 2014/0286302 A1      Sep. 25, 2014

Related U.S. Application Data

(60) Provisional application No. 61/721,436, filed on Nov. 1, 2012.

(51) Int. Cl.
*H04W 36/20* (2009.01)
*H04W 28/24* (2009.01)
(Continued)

(52) U.S. Cl.
CPC .......... *H04W 36/20* (2013.01); *H04B 7/0417* (2013.01); *H04B 7/0452* (2013.01);
(Continued)

(58) Field of Classification Search
None
See application file for complete search history.

(56) References Cited

U.S. PATENT DOCUMENTS 8,792,426 B2 * 7/2014 Montojo ............... H04L 1/0606
370/208
2001/0051994 A1   12/2001 Serizawa et al.
(Continued)

FOREIGN PATENT DOCUMENTS

EP         2369883 A1      9/2011
KR    1020090093758 A     9/2009
(Continued)

OTHER PUBLICATIONS

"3GPP MTC Standard TTA M2M Seminar", ETRI Standards Research Center, [Online] retrieved from the internet: <edu.tta.or.kr/sub3/down.php?No=123&file=M2M_1-4.pdf>, (Oct. 23, 2012).
(Continued)

*Primary Examiner* — Ayaz Sheikh
*Assistant Examiner* — Faiyazkhan Ghafoerkhan
(74) *Attorney, Agent, or Firm* — Schwegman Lundberg & Woessner, P.A.

(57) ABSTRACT

Embodiments for boosting coverage of wireless signals are generally described herein. A wireless communication device for boosting coverage of wireless signals may include a processor arranged to configure resource blocks for a sub-frame for transmitting data in a communication session, wherein the sub-frame includes at least one slot formed by a matrix of sub-carriers in the frequency domain and symbols in the time domain and a transceiver, coupled to the
(Continued)

processor, the transceiver being arranged to establish communication with entities in a network, the transceiver being further arranged to, under direction of the processor, map modulated symbols to at least a partial resource block to form a coverage boosting resource unit, the coverage boosting resource unit spreading at least one data bit over at least the partial resource block.

23 Claims, 6 Drawing Sheets (51) Int. Cl.
| | |
|---|---|
| H04W 52/02 | (2009.01) |
| H04W 24/08 | (2009.01) |
| H04J 3/06 | (2006.01) |
| H04L 5/00 | (2006.01) |
| H04W 16/24 | (2009.01) |
| H04W 8/00 | (2009.01) |
| H04W 72/04 | (2009.01) |
| H04W 76/02 | (2009.01) |
| H04B 7/04 | (2006.01) |
| H04B 7/06 | (2006.01) |
| H04W 28/02 | (2009.01) |
| H04W 4/00 | (2009.01) |
| H04W 76/04 | (2009.01) |
| H04L 29/12 | (2006.01) |
| H04W 16/20 | (2009.01) |
| H04W 16/26 | (2009.01) |
| H04W 60/04 | (2009.01) |
| H04W 64/00 | (2009.01) |
| H04W 36/14 | (2009.01) |
| H04W 24/10 | (2009.01) |
| H04J 11/00 | (2006.01) |
| H04W 28/04 | (2009.01) |
| H04W 72/06 | (2009.01) |
| H04W 72/08 | (2009.01) |
| H04W 36/30 | (2009.01) |
| H04W 72/12 | (2009.01) |
| H04W 24/04 | (2009.01) |
| H04W 88/02 | (2009.01) |
| H04W 88/08 | (2009.01) |
| H04W 88/06 | (2009.01) |
| H04W 88/16 | (2009.01) |
| H04W 24/02 | (2009.01) |

(52) U.S. Cl.
CPC .......... *H04B 7/0626* (2013.01); *H04J 3/0614* (2013.01); *H04J 11/00* (2013.01); *H04L 5/0046* (2013.01); *H04L 5/0048* (2013.01); *H04L 61/3005* (2013.01); *H04L 61/3075* (2013.01); *H04W 4/005* (2013.01); *H04W 8/005* (2013.01); *H04W 16/20* (2013.01); *H04W 16/24* (2013.01); *H04W 16/26* (2013.01); *H04W 24/04* (2013.01); *H04W 24/08* (2013.01); *H04W 24/10* (2013.01); *H04W 28/0268* (2013.01); *H04W 28/046* (2013.01); *H04W 28/24* (2013.01); *H04W 36/14* (2013.01); *H04W 36/30* (2013.01); *H04W 52/0216* (2013.01); *H04W 52/0235* (2013.01); *H04W 60/04* (2013.01); *H04W 64/003* (2013.01); *H04W 72/042* (2013.01); *H04W 72/0413* (2013.01); *H04W 72/0446* (2013.01); *H04W 72/06* (2013.01); *H04W 72/08* (2013.01); *H04W 72/1231* (2013.01); *H04W 76/023* (2013.01); *H04W 76/046* (2013.01); *H04W 76/048* (2013.01); *H04L 5/006* (2013.01); *H04W 24/02* (2013.01); *H04W 88/02* (2013.01); *H04W 88/06* (2013.01); *H04W 88/08* (2013.01); *H04W 88/16* (2013.01); *Y02B 60/50* (2013.01)

(56) References Cited

U.S. PATENT DOCUMENTS

| | | | |
|---|---|---|---|
| 2003/0072392 A1* | 4/2003 | Beadle | H04B 17/336 375/316 |
| 2003/0226096 A1* | 12/2003 | Shen | H03M 13/256 714/796 |
| 2005/0008081 A1* | 1/2005 | Yamazaki | H04L 27/38 375/259 |
| 2005/0117491 A1* | 6/2005 | Sako | G11B 20/00086 369/59.24 |
| 2005/0120265 A1* | 6/2005 | Pline | G06F 11/1008 714/6.32 |
| 2005/0135468 A1* | 6/2005 | Asuri | H03H 21/0012 375/232 |
| 2005/0146829 A1* | 7/2005 | Schoenborn | G06F 13/4072 361/139 |
| 2006/0104379 A1* | 5/2006 | Li | H04L 1/0003 375/267 |
| 2006/0117155 A1* | 6/2006 | Ware | G11C 7/1006 711/163 |
| 2006/0126708 A1* | 6/2006 | Van Den Bogaert | H04L 1/20 375/222 |
| 2006/0286946 A1* | 12/2006 | Akkarakaran | H04L 27/367 455/101 |
| 2007/0044000 A1* | 2/2007 | Shen | G11B 20/18 714/758 |
| 2007/0111747 A1 | 5/2007 | Lundby et al. | |
| 2008/0188247 A1 | 8/2008 | Worrall | |
| 2008/0267165 A1* | 10/2008 | Bertrand | H04J 3/06 370/350 |
| 2009/0129259 A1* | 5/2009 | Malladi | H04B 7/0417 370/210 |
| 2009/0238131 A1* | 9/2009 | Montojo | H04L 1/0606 370/329 |
| 2009/0245187 A1* | 10/2009 | Nam | H04L 1/1858 370/329 |
| 2010/0097937 A1 | 4/2010 | Pietraski et al. | |
| 2011/0038326 A1 | 2/2011 | Davies et al. | |
| 2011/0043275 A1* | 2/2011 | Fuks | G06F 1/3203 327/524 |
| 2011/0059744 A1 | 3/2011 | Won et al. | |
| 2011/0065443 A1* | 3/2011 | Yellin | H03M 13/13 455/452.1 |
| 2011/0110347 A1 | 5/2011 | Mun | |
| 2011/0149728 A1 | 6/2011 | Lee | |
| 2011/0176502 A1* | 7/2011 | Chung | H04W 72/042 370/329 |
| 2011/0190000 A1 | 8/2011 | Kwun | |
| 2011/0255635 A1* | 10/2011 | Lee | 375/295 |
| 2011/0261858 A1* | 10/2011 | Baldemair | H04J 11/0033 375/130 |
| 2011/0310769 A1 | 12/2011 | Lee et al. | |
| 2011/0319065 A1 | 12/2011 | Dalsgaard et al. | |
| 2012/0057519 A1* | 3/2012 | Kim | H04B 7/0413 370/315 |
| 2012/0155406 A1 | 6/2012 | Kim et al. | |
| 2012/0170508 A1* | 7/2012 | Sawai | H04B 7/155 370/315 |
| 2012/0230290 A1 | 9/2012 | Seo et al. | |
| 2012/0252518 A1 | 10/2012 | Karampatsis et al. | |
| 2013/0003668 A1* | 1/2013 | Xiao | H04L 5/001 370/329 |
| 2013/0051310 A1* | 2/2013 | Kim | H04L 5/0023 370/315 |
| 2013/0080597 A1 | 3/2013 | Liao | |
| 2013/0114587 A1* | 5/2013 | Khoryaev | H04L 5/0094 370/343 |

(56) References Cited

U.S. PATENT DOCUMENTS

| | | | | |
|---|---|---|---|---|
| 2013/0201936 A1* | 8/2013 | Chen | ................... | H04W 72/04 370/329 |
| 2013/0272215 A1* | 10/2013 | Khoryaev | ............ | H04W 28/02 370/329 |
| 2013/0303206 A1 | 11/2013 | Starsinic et al. | | |
| 2014/0016614 A1 | 1/2014 | Velev et al. | | |
| 2014/0113667 A1 | 4/2014 | Keller et al. | | |
| 2014/0269779 A1 | 9/2014 | Shan et al. | | |

FOREIGN PATENT DOCUMENTS

| | | |
|---|---|---|
| KR | 1020120094369 A | 8/2012 |
| KR | 1020120096408 A | 8/2012 |
| WO | WO-2014070480 A1 | 5/2014 |
| WO | WO-2014070649 A1 | 5/2014 |
| WO | WO-2014070901 A1 | 5/2014 |
| WO | WO-2014070929 A1 | 5/2014 |

OTHER PUBLICATIONS

"U.S. Appl. No. 14/126,611, Non Final Office Action mailed Oct. 23, 2014", 10 pgs.

"The Mobile Broadband Standard", 3GPP List of Work Items, [Online] retrieved from the internet: <http://www.3gpp.org/DynaReport/WI-List.html>.

U.S. Appl. No. 14/126,611, filed Dec. 16, 2013, Method to Enable Optimization for Small Data in an Evolved Packet Core (EPC).

U.S. Appl. No. 14/124,939, filed Dec. 9, 2013, Method and Apparatus for Controlling Small Data Transmission on the Uplink.

"U.S. Appl. No. 14/124,939, Preliminary Amendment filed Dec. 9, 2013", 9 pgs.

"U.S. Appl. No. 14/126,611, Preliminary Amendment filed Dec. 16, 2013", 11 pgs.

"Evaluation of MTC Device triggering", HTC, TD S2-110732, 3GPP TSG SA WG2 Meeting #83, (Feb. 2011), 2 pgs.

"Evolved Universal Terrestrial Radio Access (E-UTRA); Radio Resource Control (RRC)", 3GPP TS 36.331 V11.4.0 (Jun. 2013) Technical Specification Group Radio Access Network; Protocol specification (Release 11), (Jun. 2013), 346 pgs.

"Evolved Universal Terrestrial Radio Access (E-UTRA); Radio Resource Control (RRC);", 3GPP TS 36.331 V11.1.0 (Sep. 2012) Technical Specification Group Radio Access Network; Protocol specification (Release 11), (Sep. 2012), 325 pgs.

"Evolved Universal Terrestrial Radio Access (E-UTRA); Study on signalling and procedure for interference avoidance for in-device coexistence", 3GPP TR 36.816 V11.1.0 (Sep. 2011) Technical Specification Group Radio Access Network (Release 11), (Sep. 2011), 44 pgs.

"Inter-RAT mobility for UE under IDC interference", 3GPP TSG-RAN WG2 #79bis; R2-124725; Agenda Item 7.6.3; LG Electronics Inc., (Oct. 8, 2012), 1 pg.

"Inter-RAT operation for in-device coexistence", 3GPP TSG RAN WG2 Meeting #80; R2-125750; Agenda Item 7.6.1; Intel Corporation, (Nov. 12, 2012), 2 pgs.

"International Application Serial No. PCT/US2013/065599, International Search Report mailed Feb. 10, 2014", 4 pgs.

"International Application Serial No. PCT/US2013/065599, Written Opinion mailed Feb. 10, 2014", 4 pgs.

"International Application Serial No. PCT/US2013/067043, International Search Report mailed Feb. 25, 2014", 4 pgs.

"International Application Serial No. PCT/US2013/067043, Written Opinion mailed Feb. 25, 2014", 6 pgs.

"International Application Serial No. PCT/US2013/067522, International Search Report mailed Feb. 12, 2014", 3 pgs.

"International Application Serial No. PCT/US2013/067522, Written Opinion mailed Feb. 12, 2014", 6 pgs.

"International Application Serial No. PCT/US2013/067575, International Search Report mailed Feb. 21, 2014", 3 pgs.

"International Application Serial No. PCT/US2013/067575, Written Opinion mailed Feb. 21, 2014", 6 pgs.

"Relay System Simulation Results with Coverage Boosting and Control Channel Modeling", 3GPP TSG RAN WG1 Meeting #59, R1-094838, Motorola, (2009), 12 pgs.

"Title Change Request", 3GPP TSG- RAN WG2 Meeting #79bis; R2-125108, (Oct. 8, 2012), 5 pgs.

"Triggering a detached MTC device", InterDigital Communications, TD S2-110673, 3GPP TSG SA WG2 Meeting #83, (Feb. 2011), 4 pgs.

Hong, Wei, et al., "Considering In-Device Coexistence interference from WiFi point of view", IEEE 802.11-13/0880-00, (Jul. 17, 2013), 13 pgs.

"3rd Generation Partnership Project;Technical Specification Group Radio Access Network;Further Advancements for E-UTRAPhysical Layer Aspects(Release 9)", 3GPP Draft; TR 36.814_200, 3rd Generation Partnership Project (3GPP), Mobile Competence Centre ; 650, Route Des Lucioles ; F-06921 Sophia-Antipolis Cedex ; France, vol. RAN WG1, no. San Francisco, USA; Feb. 22, 2010, (Apr. 8, 2010).

"European Application Serial No. 13851994.7, Extended European Search Report mailed Jun. 28, 2016", 10 pgs.

"International Application Serial No. PCT/US2013/065599, International Preliminary Report on Patentability mailed May 14, 2015", 6 pgs.

"Relay System Simulation Results with Coverage Boosting and Control Channel Modeling", 3GPP Draft; RI-094838—Relay SYS-SIM Results W Coverage Boosting and CCH Modeling—, 3rd Generation Partnership Project (3GPP), Mobile Competence Centre ; 650, Route Des Lucioles ; F-06921 Sophia-Antipolis Cedex ; France,, (Nov. 4, 2009).

Huawei, et al., "Bandwidth reduction for low cost MTC UE and text proposal", 3GPP Draft; RI-120051, 3rd Generation Partnership Project (3GPP), Mobile Competence Centre ; 650, Route Des Lucioles ; F-06921 Sophia-Antipolis Cedex ; France, vol. RAN WG1, no. Dresden, Germany; Feb. 6, 2012-Feb. 10, 2012, XP050562638, (Jan. 31, 2012).

* cited by examiner

COVERAGE BOOSTING TRANSMISSION METHOD FOR LTE TECHNOLOGY

This application is a U.S. National Stage Filing under 35 U.S.C. 371 from International Application No. PCT/US2013/065599, filed Oct. 18, 2013, which claims the benefit of priority to U.S. Provisional Patent Application Ser. No. 61/721,436, filed on Nov. 1, 2012, all of which are incorporated herein by reference in their entireties.

BACKGROUND

The machine type communication (MTC) market is a growing sector and network operators are looking for new type of services that can be provided to end users. One of the applications for MTC market is smart metering. For example MTC devices can be installed to power meters to monitor power consumptions at homes and enterprises. There are at least two main challenges to support these services in the next generation broadband technology, such as Long Term Evolution (LTE). First, the cost of MTC devices is too high compared to LTE terminals, such as smart phones. Also, the coverage for MTC terminals for the smart meter like services may need to be improved, especially assuming that those devices are likely to be installed at the basement level.

The problem of cost reduction was studied during the LTE Rel.11 timeframe in the framework of the "Provision of Low Cost MTC User Equipments (UEs) Based on LTE." To transmit signals between devices, such as a mobile phone, a computer, or any remotely controlled machine, a radio access network (RAN) is defined to provide connections between devices and a core network (CN). RAN Working Group 1 (WG1), also referred to as RAN1, is responsible for radio layer 1, which is the physical layer of the radio interface for UE, Universal Terrestrial Radio Access Network (UTRAN), Evolved UTRAN, and beyond; covering the frequency division duplex, (FDD) and time division duplex (TDD) modes of the radio interface.

The RAN1 WG has identified several cost reduction strategies that can reduce cost of the LTE modem and break it down to the level of Global System for Mobile Communications (GSM)/Enhanced General packet radio service (EGPRS) modems. Strategies that allow substantial cost reduction include bandwidth reduction, peak data rate reduction and a radio frequency (RF) chain, half duplex operation, reduced set of transmission modes and limitation of the maximum transmit power. Almost each of these strategies leads to the degradation of the coverage characteristics for low cost MTC terminals and solutions to improve coverage beyond the current coverage characteristics need to be developed for almost every physical data and control channel.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass available equivalents of those claims.

Embodiments described herein reduce the cost of MTC devices, for example, to the cost associated with LTE terminals. This reduction in cost of MTC devices will allow MTC device to enter the low-end market where the price of the power meter is much lower than the price of the high-end smartphones, laptops and tablets. Embodiments described herein also improve the coverage for MTC terminals. Typically the MTC devices are installed deeply inside of building at basement level and thus suffer from additional penetration loss that can be reached up to 10-20 dB.

Figure 1:
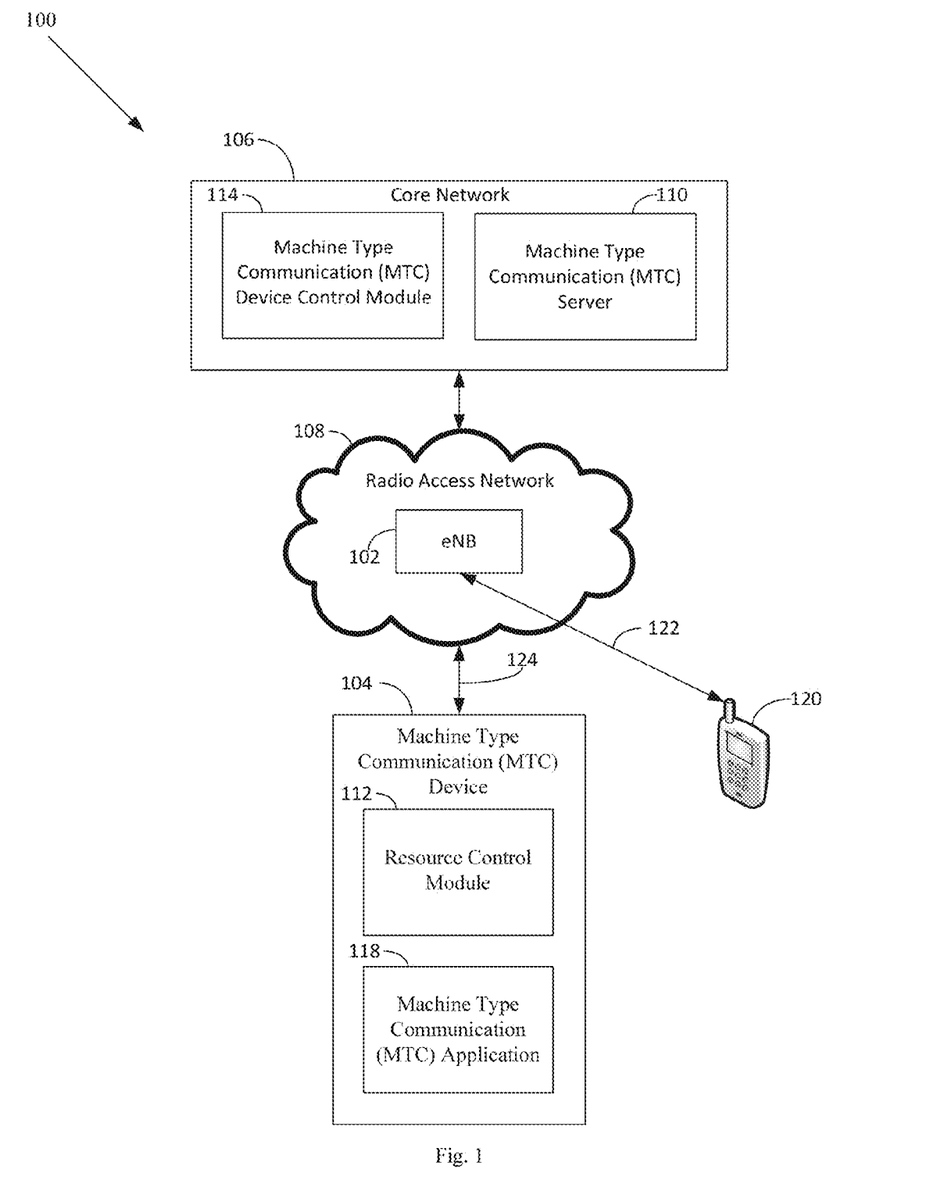
FIG. 1 is a block diagram illustrating a wireless communication system according to an embodiment.

FIG. 1 is a block diagram illustrating a wireless communication system 100 according to an embodiment. The wireless communication system 100 may include a core network (CN) 106, an evolved node B 102 and a machine type communication (MTC) device 104. An evolved node B 102 may be in wireless communication with one or more machine type communication (MTC) devices 104. An evolved node B 102 may be referred to as a base station, an access point, a Node B, an eNodeB, eNB or some other terminology. The term "eNB" is used herein. The eNB 102 and its coverage area may be referred to as a radio access network (RAN) 108. A wireless communication device 120 may be referred to as a mobile station, a subscriber station, an access terminal, a remote station, a user terminal, a terminal, a handset, a subscriber unit, user equipment (UE), etc. The term UE is used herein. UE 120 may further be implemented as a module of cellular phone, a smart phone, a laptop, a personal digital assistant (PDA), a wireless modem, surveillance equipment, smart meters for utility systems, fleet management devices, production chain monitoring devices, etc. UE 120 may transmit data to the eNB 102 over a radio frequency (RF) communication channel 122. Likewise, the eNB 102 may transmit data to the UE 120 over a radio frequency (RF) communication channel.

A machine type communication (MTC) device 104 may communicate with one or multiple eNBs 102 over a radio frequency (RF) communication channel 122. In one configuration, the machine type communication (MTC) device 104 may communicate with the eNB 102 on the downlink and/or uplink at any given moment. The downlink refers to the communication link from an eNB 102 to UE 120 or a machine type communication (MTC) device 104. The uplink refers to the communication link from the UE 120 or a machine type communication (MTC) device 104 to an eNB 102. The communication link may be established using a single-input and single-output (SISO), multiple-input and single-output (MISO) or a multiple-input and multiple-output (MIMO) system. A MIMO system may include a transmitter and a receiver equipped with multiple transmit and receive antennas. The Third Generation Partnership Project (3GPP) is a collaboration between groups of telecommunications associations to make globally applicable mobile phone system specifications. Long Term Evolution (LTE) is the project name of a high performance air interface for cellular mobile telephony. Long Term Evolution Advanced (LTE-A) is a mobile communication standard that works as an enhancement to the LTE air interface. 3GPP LTE-A provides for the functionality that enables the use of machine type communication (MTC) devices 104.

A machine type communication (MTC) device 104 is similar to UE 120. A machine type communication (MTC) device 104 may use the physical (PHY) layer, medium access control (MAC) layer, radio link control (RLC) layer, the Packet Data Convergence Protocol (PDCP) and the Radio Resource Control (RRC) layer to establish a communication link 124 with an eNB 102 and the core network (CN) 106. However, a machine type communication (MTC) device 104 may not provide a human interface. Instead, a machine type communication (MTC) device 104 may operate as a network access point, e.g., between data acquisition/data aggregation devices and a machine type communication (MTC) server 110. A machine type communication (MTC) server 110 may be a device that uses the core network (CN) 106 to facilitate a connection with a machine type communication (MTC) application 118. Examples of machine type communication (MTC) devices 104 include surveillance equipment, smart meters for utility systems, fleet management devices and production chain monitoring devices.

An eNB 102 may be configured to establish communication links with multiple UE 120 and/or multiple machine type communication (MTC) devices 104. Because of the limited communication demands requested for machine type communication (MTC) devices 104, many more machine type communication (MTC) devices 104 may be served by an eNB 102 than UE 120 influenced by the eNB 102. It is speculated that ten times as many machine type communication (MTC) devices 104 will soon be under the influence of a eNB 102 compared to UE 120.

A power utility may install a "smart meter" on a house. The "smart meter" may be a type of machine type communication (MTC) application 118. The power utility may use a machine type communication (MTC) server 110 to access (i.e., control, get data from, send data to) the machine type communication (MTC) application 118. The machine type communication (MTC) server 110 may use the services of the core network (CN) 106 to establish a communication channel with the machine type communication (MTC) device 104 and ultimately with the machine type communication (MTC) application 118. The machine type communication (MTC) server 110 may be represented as part of the core network (CN) 106 as shown in FIG. 1. Alternatively, the machine type communication (MTC) server 110 may be external to the core network (CN) 106.

Machine type communication (MTC) devices 104 may be provisioned at the application level by a machine type communication (MTC) server 110 or at the device level by the core network (CN) 106.

The current LTE-A specification for operation of UEs 120 does not provide a mechanism implemented in the machine type communication (MTC) device 104 that limits the number of access attempts that the machine type communication (MTC) device 104 can make over a given period of time. The machine type communication (MTC) device 104 may include a resource control module 112 to remedy this problem.

A resource control module 112 may be included in the machine type communication (MTC) device 104 to provide the ability to detect predetermined conditions to prevent the machine type communication (MTC) application 118 from causing harm to the network. Examples of machine type communication (MTC) applications 118 include remote meter readers, highway traffic sensors and vending machine status reporters. The resource control module 112 may also allow the machine type communication (MTC) device 104 to receive and implement commands sent by a machine type communication (MTC) device control module 114 on the core network (CN) 106.

Figure 2:
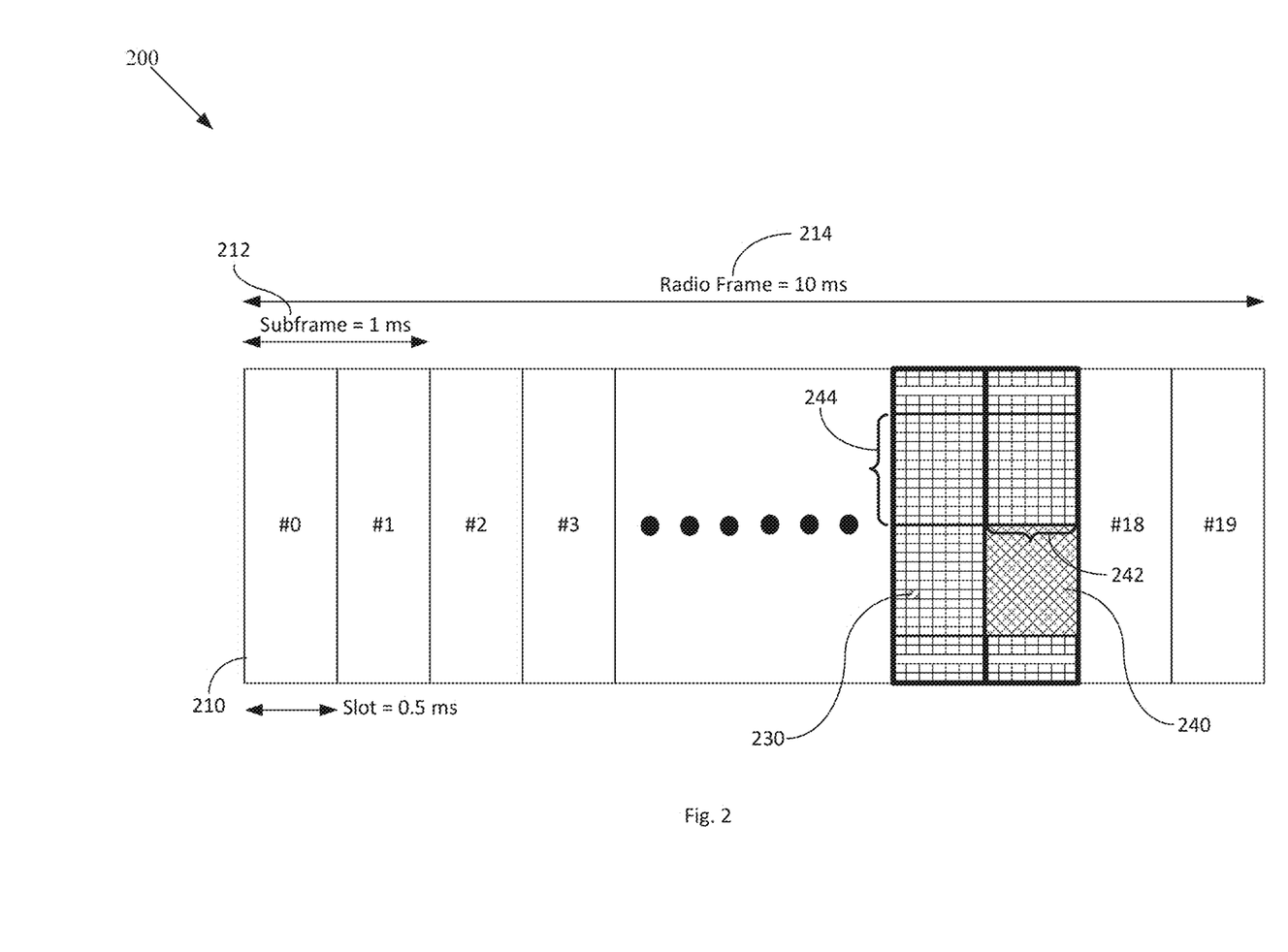
FIG. 2 illustrates a frame structure according to an embodiment.

FIG. 2 illustrates a frame structure 200 according to an embodiment. In FIG. 2, the frame 200 has an overall length of 10 ms. This is then divided into a total of 10 subframes each of two slots i.e. 20 individual slots 210. Each subframe 212 includes two slots 210 of length 0.5 ms. A resource element (RE) 230 is the smallest identifiable unit of transmission and each resource element 230 corresponds to one complex-valued modulation symbol, e.g. a subcarrier of the one OFDM modulated symbol. Transmissions are scheduled in larger units called physical resource blocks (RBs) 240. The number of OFDM symbols per slot 210 is 7 for cyclic prefix and 6 for extended cyclic prefix. A resource block 240 is defined as 7 or 6 consecutive OFDM symbols 242 in the time domain depending on the cyclic prefix length and 12 consecutive sub-carriers 244 in the frequency domain.

Figure 3:
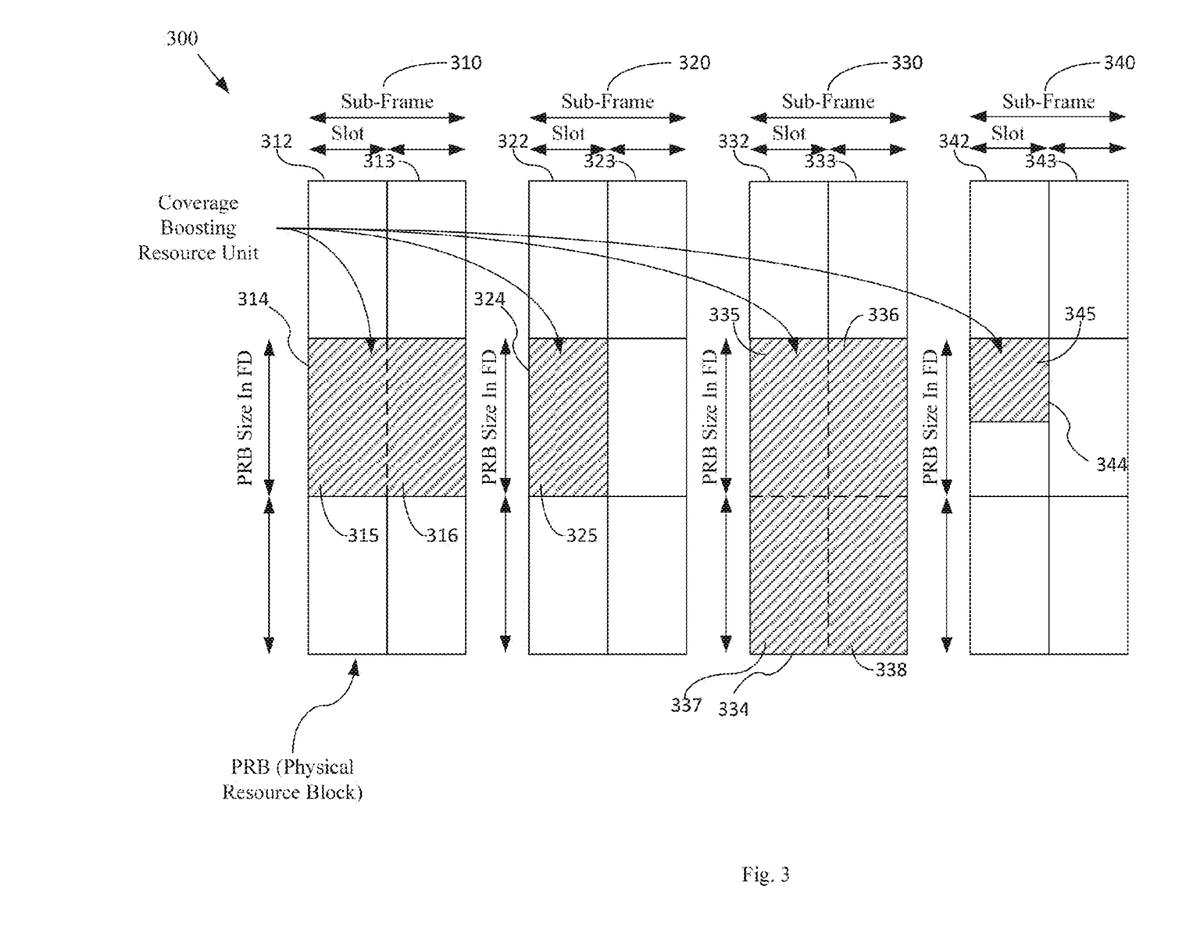
FIG. 3 illustrates coverage boosting resource unit (CBRU) configurations according to an embodiment.

FIG. 3 illustrates coverage boosting resource unit (CBRU) configurations 300 according to an embodiment. In FIG. 3, four sub-frames 310, 320, 330, 340 are shown. Each of the four sub-frames 310, 320, 330, 340 includes two slots 312/313, 322/323, 332/333, 342/343, respectively. The slots 312, 313, 322, 323, 332, 333, 342, 343 each represent 5 milliseconds in the time domain. In sub-frame 310, the CBRU 314 is spread over two resource blocks 315, 316. In sub-frame 320, the CBRU 324 is spread over one resource block 325. In sub-frame 330, the CBRU 334 is spread over four resource blocks 335, 336, 337, 338. In sub-frame 340, the CBRU 344 is spread over a partial resource block 345. A partial resource block as used herein refers to less than a full resource block, e.g., fewer OFDM symbols in the time domain and/or fewer than 12 consecutive sub-carriers 244 in the frequency domain. For example, the partial resource block 345 uses 6 of the sub-carriers instead of 12 sub-carriers. In general one CBRU can be defined as a unit composed from the set of resource elements, over which the spreading is applied. For example, one CBRU may be at least one partial resource element such as shown by partial resource element 345, one resource element such as shown by resource block 325, a plurality of resource blocks as shown by resource blocks 315, 316, or by resource blocks 335, 336, 337, 338, or a combination of the above.

To improve coverage of low-cost MTC devices beyond coverage of LTE devices, the energy per information bit should be increased substantially. The energy from multiple consecutive sub-frames 310, 320, 330, 340, or frames which includes 10 of the sub-frames, is accumulated to increase the energy per transmitted information bit. However, MTC devices use very low data rates and are tolerable to latency. For instance, transmissions with 100 bytes/message with latency of up to 10 seconds are acceptable for MTC service in metering applications. These traffic characteristics can be exploited to improve coverage of MTC device at the expense of throughput.

Additional new transmission modes can be designed in LTE to boost system coverage in the order of 10-20 dB relative to existing coverage. From the physical layer perspective, substantial changes may be made in physical layer to boost coverage by tens of dB. The existing LTE physical frame structure and uplink (UL) and downlink (DL) modulations, e.g., Single Carrier Frequency Division Multiple Access (SC-FDMA) and Orthogonal Frequency-Division Multiple Access (OFDMA) respectively, may be followed as much as possible when boosting coverage. However, other embodiments may deviate from the ordinary LTE modulation and physical frame structure. Thus, the CBRU configurations 300 are used to support a coverage boosting transmission mode (CBTM).

Figure 4:
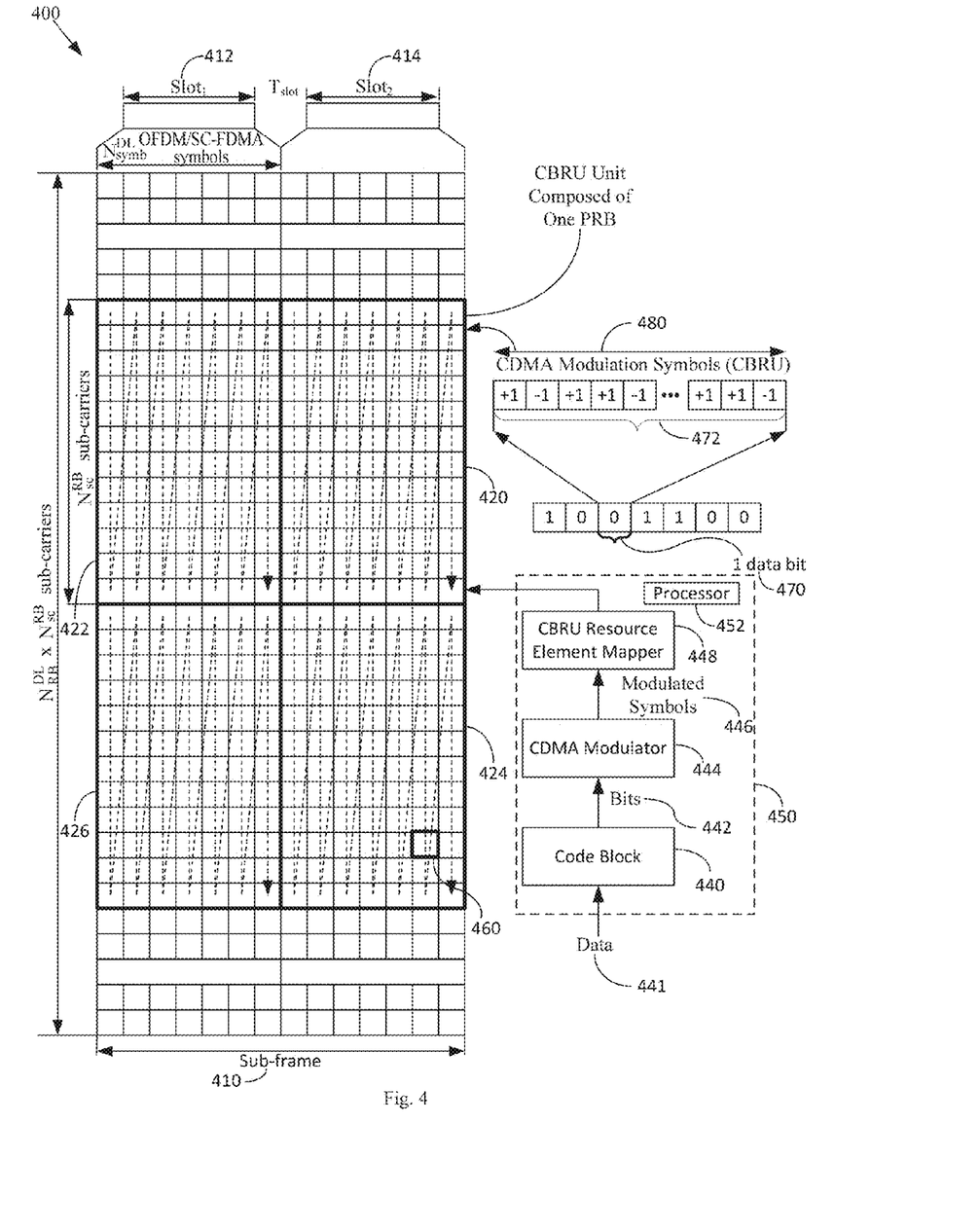
FIG. 4 illustrates Code Division Multiple Access (CDMA) based modulation of one encoded bit carried by a CBRU of one physical resource block 400 according to an embodiment.

FIG. 4 illustrates Code Division Multiple Access (CDMA) based modulation of one encoded bit carried by a CBRU of one physical resource block 400 according to an embodiment. In FIG. 4, one sub-frame 410 is shown. The sub-frame includes two slots 412, 414. Four resource blocks 420, 422, 424, 426 are shown. Each resource block 420, 422, 424, 426 includes $N_{sc}^{RB}$ sub-carriers, e.g., 12 sub-carriers as shown in FIG. 4. Each slot 412, 414 includes $N^{RB}$ resource blocks, each resource block 420, 422, 424, 426 including $N_{sc}^{RB}$ sub-carriers in the frequency domain. Each slot 412, 414 includes $N_{symb}^{DL}$ symbols in the time domain, e.g, 7 symbols are shown in the time domain for each slot shown in FIG. 4.

FIG. 4 illustrates an encoding/mapping portion of a transceiver 450 according to an embodiment. Processor 452 may be arranged to configure resource blocks for a sub-frame for transmitting data in a communication session. The sub-frame may include at least two slots formed by a matrix of sub-carriers in the frequency domain and symbols in the time domain. The transceiver may be arranged to establish communication with entities in a network. Under direction of the processor, the transceiver may be arranged to map modulated symbols to at least a partial resource block to form a coverage boosting resource unit, that may occupy resource elements of multiple physical resource blocks (PRBs) or part of the one PRB, depending on the required coverage improvement level. The coverage boosting resource unit spreads at least one data bit over resources occupied by at least the partial resource block. As shown in FIG. 4, a code block 440 receives data 441 and produces coded bits of data 442 at an output. A CDMA modulator 444 processes the CDMA coded data 442 and generates a CDMA waveform, i.e., modulated symbols 446. Any type of CDMA code can be applied to improve coverage. For instance the orthogonal or quasi-orthogonal codes can be used. The modulated symbols 446 are provided to a CBRU resource element mapper 448. The CBRU resource element mapper 448 maps the modulated symbols 446 to sub-carriers and OFDMA/SC-FDMA symbols in at least a partial resource block of resource blocks 420, 422, 424, 426.

Accordingly, CDMA modulation may be applied in the frequency and time domain over resource elements (REs) 460 used for generation of SC-FDMA and/or OFDMA waveforms to boost coverage. Narrow bandwidth device regions (NBDRs) within LTE physical frame structure may be used to allow operation of narrow bandwidth MTC terminals in wide bandwidth system deployments. For example, to support operation of narrow bandwidth wireless device (e.g., MTC or other type of devices) in a wireless network with arbitrary bandwidth configuration, the available spectrum can be divide into multiple narrow bandwidth regions or narrow bandwidth device regions (NBDR) of a certain granularity in frequency (e.g., 1.4 MHz). For illustration purposes, the NBDR can be considered as chunks of physical spectrum where narrow bandwidth wireless devices can communicate with a node (e.g., eNodeB). When the coverage boosting transmission mode (CBTM) with the proper CBRU configurations is activated, a CDMA based principle may be applied for signal transmission and reception.

As shown in FIG. 4, one or several encoded bits 470 may be spread over multiple resource elements 472 of a logical resource unit, which is referred to herein as a coverage boosting resource unit (CBRU) 480, e.g., one resource block 420 as shown in FIG. 4. The CBRU 480 is generated using at least a partial net of resource elements which are allocated over frequency and time axes of the LTE physical structure. For example, the CBRU 480 may be represented by one physical resource block (PRB) 420, i.e. composed from 12 subcarriers and 7 OFDMA/SC-FDMA symbols, according to an embodiment. Further, as suggested CBRUs 480 may also be configured to span part of a PRB or several PRBs in one sub-frame or any given set of resource elements. The particular configuration of the CBRU 480 may depend on the level of coverage boosting that needs to be achieved. For instance to improve coverage on 10 dB at least 10 REs are needed to form the CBRU.

Multiple CBRUs 480 spanning over multiple $N_{SF}$ sub-frames over $N_F$ frames may form one allocation for transmission of one information message. The transmission may follow one predefined format. For example, a format may be explicitly specified, e.g., the amount of CBRUs 480 that form one data allocation, such as 1000 CBRUs 480. Alternatively, the transmission may be configured by a higher layer or a new physical layer signaling.

The internal CBRU 480 physical structure may also include a preconfigured reference signal to perform channel estimation and other signal synchronization tasks. The number of data physical resource elements that form a CBRU 480 and the amount of reference signals may be configurable by higher layer signaling or physical layer signaling. An arbitrary type of CDMA code with good autocorrelation and cross-correlation properties may be applied for modulation of the encoded bits carried by one CBRU 480.

Thus, according to an embodiment a coverage boosting transmission mode is provided and coverage boosting, e.g., 20 dB, may be achieved by CDMA spreading of the encoded bits and may be applied for coverage limited devices, e.g., MTC or other types of coverage constrained devices.

Coverage boosting mode according to an embodiment is compatible with existing LTE physical frame structures, may be applied to future LTE system and may be used with Enhanced Physical Downlink Control Channel (ePDCCH) and new carrier types (NCT), e.g., a lean carrier which includes a minimized control channel and reference signal overhead to increase resource utilization and to reduce interference thereby increasing spectral efficiency and reducing energy consumption.

The configurable CBRUs 480 according to an embodiment use CDMA modulation of the encoded information bits to ensure a required coverage level for given MTC terminal. The general CBRU structure 480 according to an embodiment may be further applied to enhance the coverage of data and control resource allocations including localized and distributed modes. The multiple coverage limited devices, e.g., MTCs, may be multiplexed in the same CBRUs 480 due to applied CDMA in the frequency domain, which may facilitate increased capacity of served coverage limited devices. The LTE Release 12 and beyond UEs/eNodeBs may eliminate interference from/to MTC UEs because the transmission is very robust and may be easily detected and then subtracted from received signal by UEs/eNodeBs. This may minimize the impact on network spectral efficiency from MTC terminals.

Figure 5:
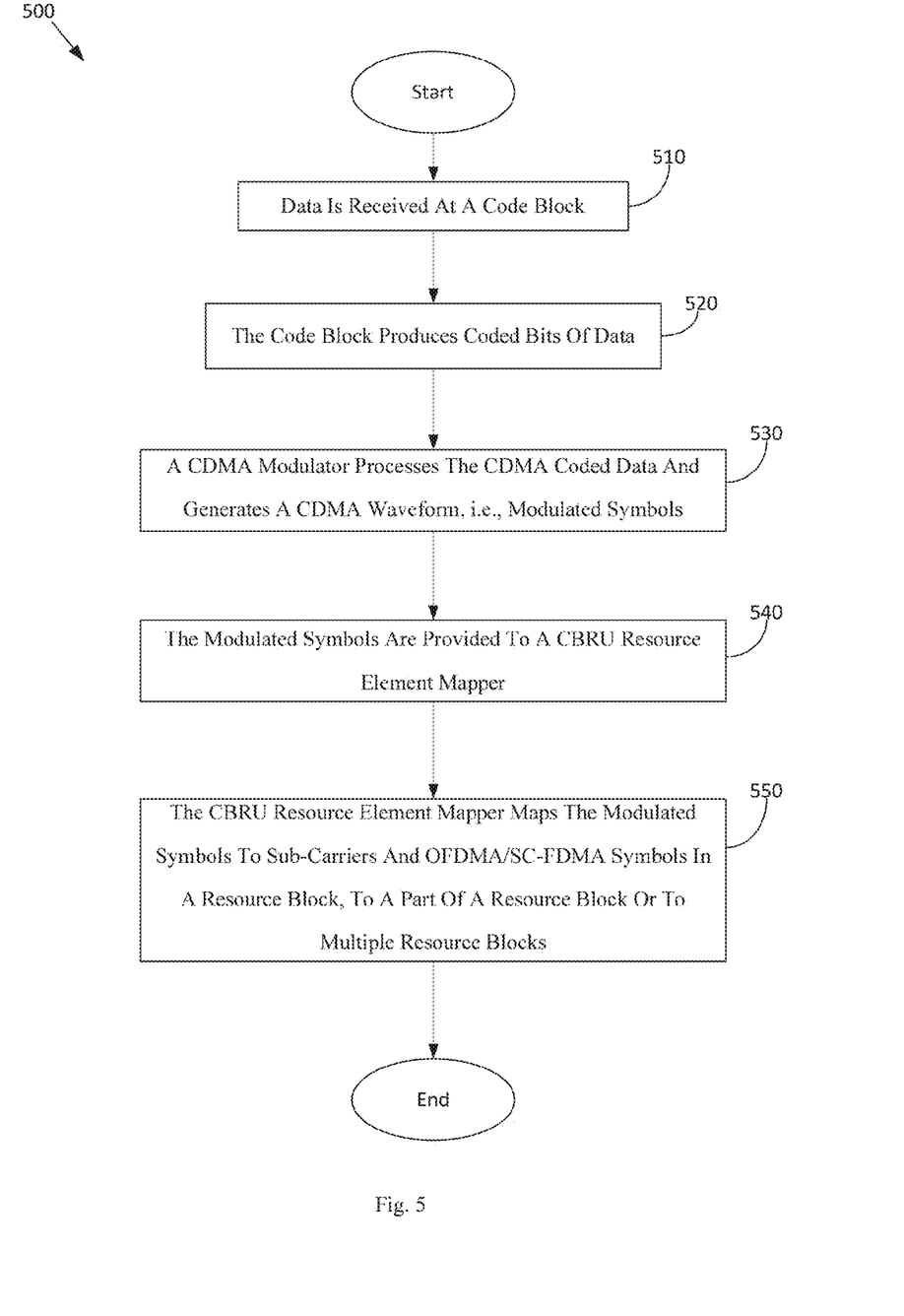
FIG. 5 is a flowchart of a method for boosting system coverage using CBRUs according to an embodiment.

FIG. 5 is a flowchart 500 of a method for boosting system coverage using CBRUs according to an embodiment. In FIG. 5, data is received at a code block 510. The code block produces coded bits of data 520. A CDMA modulator processes the CDMA coded data and generates a CDMA waveform, i.e., modulated symbols 530. The modulated symbols are provided to a CBRU resource element mapper 540. The CBRU resource element mapper maps the modulated symbols to sub-carriers and OFDMA/SC-FDMA symbols in a resource block, to a part of a resource block or to multiple resource blocks 550. Thus, the energy per information bit is increased by spreading and accumulating the energy from multiple consecutive sub-frames.

Figure 6:
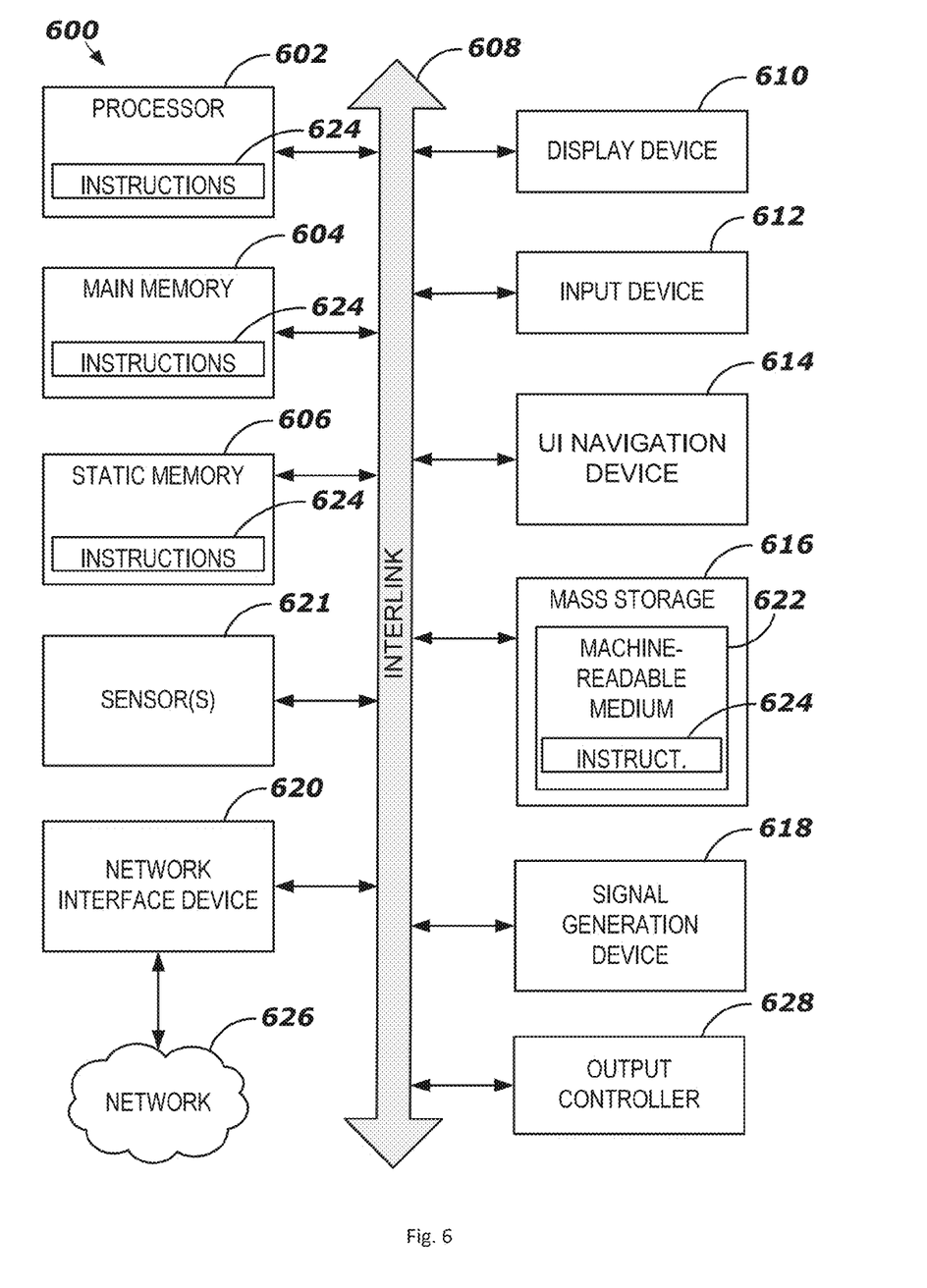
FIG. 6 illustrates a block diagram of an example machine 600 for boosting system coverage by increasing the energy per bit according to an embodiment.

FIG. 6 illustrates a block diagram of an example machine 600 for boosting system coverage by increasing the energy per bit according to an embodiment upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine and/or a client machine in server-client network environments. In an example, the machine 600 may act as a peer machine in peer-to-peer (P2P) (or other distributed) network environment. The machine 600 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 602 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 602 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 600 may include a hardware processor 602 (e.g., a central processing unit (CPU), a graphics processing unit (GPU), a hardware processor core, or any combination thereof), a main memory 604 and a static memory 606, at least some of which may communicate with others via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR)) connection to communicate or control one or more peripheral devices (e.g., a printer, card reader, etc.).

The storage device 616 may include at least one machine readable medium 622 on which is stored one or more sets of data structures or instructions 624 (e.g., software) embodying or utilized by any one or more of the techniques or functions described herein. The instructions 624 may also reside, at least partially, additional machine readable memories such as main memory 604, static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) that configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

For example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

Additional Notes & Examples

Example 1 may include subject matter (such as a device, apparatus, client or system) including a processor arranged to configure resource blocks for a sub-frame for transmitting data in a communication session, wherein the sub-frame includes at least one slot formed by a matrix of sub-carriers in a frequency domain and symbols in a time domain; and
 a transceiver, coupled to the processor, the transceiver being arranged to establish communication with entities in a network, the transceiver being further arranged to, under direction of the processor, map modulated symbols to at least a partial resource block to form a coverage boosting resource unit, the coverage boosting resource unit spreading at least one data bit over at least the partial resource block.

Example 2 may optionally include the subject matter of Example 1, wherein the at least partial resource block comprises one resource block in the at least one slot.

Example 3 may optionally include the subject matter of any one or more of Examples 1-2, wherein the at least partial resource block comprises a first resource block in a first of the at least one slot and a second resource block in a second of the at least one slot.

Example 4 may optionally include the subject matter of any one or more of Examples 1-3, wherein the at least partial resource block comprises a first resource block in a first of the at least one slot and a second resource block in the first of the at least one slot.

Example 5 may optionally include the subject matter of any one or more of Examples 1-4, wherein the at least partial resource block comprises a plurality of first resource blocks in a first of the at least one slot and a plurality of second resource blocks in the second of the at least one slot.

Example 6 may optionally include the subject matter of any one or more of Examples 1-5, wherein the transceiver includes a code block arranged to receive data and to produce bits of encoded data, a modulator arranged to process the encoded data and to generate modulated symbols, and a coverage boosting resource unit mapper arranged to receive the modulated symbols and to map the modulated symbols to sub-carriers and symbols in at least the partial resource block.

Example 7 may optionally include the subject matter of any one or more of Examples 1-6, wherein modulator comprises a code division multiple access modulator, the code division multiple access modulator generating code division multiple access modulated symbols.

Example 8 may optionally include the subject matter of any one or more of Examples 1-7, wherein the at least partial resource block includes Nsc sub-carriers, each subcarrier comprising Nsymb symbols.

Example 9 may optionally include the subject matter of any one or more of Examples 1-8, wherein the coverage boosting resource unit comprises narrow bandwidth device regions (NBDRs) arranged to allow operation of narrow bandwidth machine type communication (MTC) terminals in a wide bandwidth system.

Example 10 may optionally include the subject matter of any one or more of Examples 1-9, wherein the at least partial resource block comprises a plurality of coverage boosting resource units spanning NSF sub-frames over NF frames to form one allocation for transmission of one information message.

Example 11 may optionally include the subject matter of any one or more of Examples 1-10, wherein the coverage boosting resource unit or narrow bandwidth allocation further includes a preconfigured reference signal arranged to perform channel estimation and signal synchronization tasks.

Example 12 may optionally include the subject matter of any one or more of Examples 1-11, wherein the coverage boosting resource unit is arranged in physical downlink shared channel (PDSCH), physical uplink shared channel (PUSCH), physical uplink control channel (PUCCH) or an enhanced physical downlink control channel (ePDCCH).

Example 13 may optionally include the subject matter of any one or more of Examples 1-12, wherein the coverage boosting resource unit is arranged in a lean carrier that includes a minimized control channel and reference signal overhead to increase resource utilization and to reduce interference to increase spectral efficiency and reduce energy consumption.

Example 14 may include subject matter (such as a method or means for performing acts) including configuring, by a processor, resource blocks for a sub-frame for transmitting data in a communication session, wherein the sub-frame includes at least one slot formed by a matrix of sub-carriers in a frequency domain and symbols in a time domain; and
 mapping, by a transceiver under direction of the processor, modulated symbols to at least a partial resource block to form a coverage boosting resource unit, the coverage boosting resource unit spreading at least one data bit over at least the partial resource block.

Example 15 may optionally include the subject matter of Example 14, wherein the mapping modulated symbols to at least the partial resource block comprises mapping modulated symbols to one resource block in the at least one slot.

Example 16 may optionally include the subject matter of any one or more of Examples 14-15, wherein the mapping modulated symbols to at least the partial resource block comprises mapping modulated symbols to a first resource block in a first of the at least one slot and a second resource block in a second of the at least one slot.

Example 17 may optionally include the subject matter of any one or more of Examples 14-16, wherein the mapping modulated symbols to at least the partial resource block comprises mapping modulated symbols to a first resource block in a first of the at least one slot and a second resource block in the first of the at least one slot.

Example 18 may optionally include the subject matter of any one or more of Examples 14-17, wherein the mapping modulated symbols to at least the partial resource block comprises mapping modulated symbols to a plurality of first resource blocks in a first of the at least one slot and a plurality of second resource blocks in the second of the at least one slot.

Example 19 may optionally include the subject matter of any one or more of Examples 14-18, wherein the mapping modulated symbols further comprises receiving data at a code block arranged to produce bits of encoded data, receiving the encoded data at a modulator arranged to modulate the encoded data to generate modulated symbols, and mapping, by a coverage boosting resource unit mapper, the modulated symbols to sub-carriers and symbols in at least the partial resource block.

Example 20 may optionally include the subject matter of any one or more of Examples 14-19, wherein modulating the encoded data comprises modulating the encoded data using code division multiple access.

Example 21 may optionally include the subject matter of any one or more of Examples 14-20, wherein the mapping modulated symbols to the at least partial resource block further comprises mapping the modulated symbols to Nsc sub-carriers, each subcarrier comprising Nsymb symbols.

Example 22 may optionally include the subject matter of any one or more of Examples 14-21, wherein the mapping modulated symbols to the at least partial resource block to form the coverage boosting resource unit further includes forming narrow bandwidth device regions (NBDRs) to allow operation of narrow bandwidth machine type communication (MTC) terminals in a wide bandwidth system.

Example 23 may optionally include the subject matter of any one or more of Examples 14-22, wherein the mapping the modulated symbols to the at least partial resource block to form the coverage boosting resource unit comprises mapping the modulated symbols to the at least partial resource block to form a plurality of coverage boosting resource units spanning NSF sub-frames over NF frames to form one allocation for transmission of one information message.

Example 24 may optionally include the subject matter of any one or more of Examples 14-23, wherein the mapping modulated symbols to the at least partial resource block to form the coverage boosting resource unit further includes forming a preconfigured reference signal arranged to perform channel estimation and signal synchronization tasks.

Example 25 may optionally include the subject matter of any one or more of Examples 14-24, wherein the mapping modulated symbols to the at least partial resource block to form the coverage boosting resource unit further includes forming the coverage boosting resource unit in physical downlink shared channel (PDSCH), physical uplink shared channel (PUSCH), physical uplink control channel (PUCCH) or an enhanced physical downlink control channel (ePDCCH).

Example 26 may optionally include the subject matter of any one or more of Examples 14-25, wherein the mapping modulated symbols to the at least partial resource block to form the coverage boosting resource unit further includes mapping modulated symbols in a lean carrier that includes a minimized control channel and reference signal overhead to increase resource utilization and to reduce interference to increase spectral efficiency and reduce energy consumption.

Example 27 may include subject matter (such as means for performing acts or machine readable medium including instructions that, when executed by the machine, cause the machine to perform acts) including configuring, by a processor, resource blocks for a sub-frame for transmitting data in a communication session, wherein the sub-frame includes at least one slot formed by a matrix of sub-carriers in a frequency domain and symbols in a time domain; and mapping, by a transceiver under direction of the processor, modulated symbols to at least a partial resource block to form a coverage boosting resource unit, the coverage boosting resource unit spreading at least one data bit over at least the partial resource block.

Example 28 may optionally include the subject matter of Example 27, wherein the mapping modulated symbols to at least the partial resource block comprises selecting at least one from a group consisting of:

mapping modulated symbols to one resource block in the at least one slot; and mapping modulated symbols to a first resource block in a first of the at least one slot and a second resource block in a second of the at least one slot; and mapping modulated symbols to a first resource block in a first of the at least one slot and a second resource block in the first of the at least one slot; and mapping modulated symbols to a plurality of first resource blocks in a first of the at least one slot and a plurality of second resource blocks in the second of the at least one slot.

Example 29 may optionally include the subject matter of any one or more of Examples 27-28, wherein the mapping modulated symbols further comprises receiving data at a code block arranged to produce bits of encoded data, receiving the encoded data at a modulator arranged to modulate the encoded data to generate modulated symbols, and mapping, by a coverage boosting resource unit mapper, the modulated symbols to sub-carriers and symbols in at least the partial resource block.

Example 30 may optionally include the subject matter of any one or more of Examples 27-29, wherein the mapping modulated symbols to at least the partial resource block comprises selecting at least one from a group consisting of:

mapping the modulated symbols to Nsc sub-carriers, each subcarrier comprising Nsymb symbols;

forming narrow bandwidth device regions (NBDRs) in the at least partial resource block to allow operation of narrow bandwidth machine type communication (MTC) terminals in a wide bandwidth system;

mapping the modulated symbols to the at least partial resource block to form a plurality of coverage boosting resource units spanning NSF sub-frames over NF frames to form one allocation for transmission of one information message;

including a preconfigured reference signal arranged to perform channel estimation and signal synchronization tasks; and mapping modulated symbols in a lean carrier that includes a minimized control channel and reference signal overhead to increase resource utilization and to reduce interference to increase spectral efficiency and reduce energy consumption.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A wireless communication device for boosting coverage of wireless signals, comprising:
    a processor arranged to configure resource blocks for a sub-frame for transmitting data in a communication session, wherein the sub-frame includes at least one slot formed by a matrix of sub-carriers in a frequency domain and symbols in a time domain; and
    a transceiver, coupled to the processor, the transceiver being arranged to establish communication with entities in a network, the transceiver being further arranged to, under direction of the processor, map modulated symbols to at least a partial resource block to form a coverage boosting resource unit, the coverage boosting resource unit spreading at least one data bit, each data bit that is spread being spread over a plurality of resource elements or a plurality of resource blocks of the at least the partial resource block,
    wherein the map modulated symbols to the at least partial resource block to form the coverage boosting resource unit further includes mapping modulated symbols in a lean carrier that includes a minimized control channel and reference signal overhead to increase resource utilization and to reduce interference to increase spectral efficiency and reduce energy consumption.

2. The wireless communication device of claim 1, wherein the at least partial resource block comprises one resource block in the at least one slot.

3. The wireless communication device of claim 1, wherein the at least partial resource block comprises a first resource block in a first of the at least one slot and a second resource block in a second of the at least one slot.

4. The wireless communication device of claim 1, wherein the at least partial resource block comprises a first resource block in a first of the at least one slot and a second resource block in the first of the at least one slot.

5. The wireless communication device of claim 1, wherein the at least partial resource block comprises a plurality of first resource blocks in a first of the at least one slot and a plurality of second resource blocks in a second of the at least one slot.

6. The wireless communication device of claim 1, wherein the transceiver comprises:
    a code block arranged to receive data and to produce bits of encoded data,
    a modulator arranged to process the encoded data and to generate modulated symbols, and
    a coverage boosting resource unit mapper arranged to receive the modulated symbols and to map the modulated symbols to sub-carriers and symbols in the at least the partial resource block.

7. The wireless communication device of claim 1, wherein the at least partial resource block includes $N_{sc}$ sub-carriers, each subcarrier comprising $N_{symb}$ symbols.

8. The wireless communication device of claim 1, wherein the coverage boosting resource unit comprises narrow bandwidth device regions (NBDRs) arranged to allow operation of narrow bandwidth machine type communication (MTC) terminals in a wide bandwidth system.

9. The wireless communication device of claim 1, wherein the at least partial resource block comprises a plurality of coverage boosting resource units spanning $N_{SF}$ sub-frames over $N_F$ frames to form one allocation for transmission of one information message.

10. The wireless communication device of claim 1, wherein the coverage boosting resource unit further includes a preconfigured reference signal arranged to perform channel estimation and signal synchronization tasks.

11. A method for boosting coverage of wireless signals, comprising:
  configuring, by a processor, resource blocks for a sub-frame for transmitting data in a communication session, wherein the sub-frame includes at least one slot formed by a matrix of sub-carriers in a frequency domain and symbols in a time domain; and
  mapping, by a transceiver under direction of the processor, modulated symbols to at least a partial resource block to form a coverage boosting resource unit, the coverage boosting resource unit spreading at least one data bit over the at least the partial resource block,
  wherein the mapping modulated symbols to the at least partial resource block to form the coverage boosting resource unit further includes mapping modulated symbols in a lean carrier that includes a minimized control channel and reference signal overhead to increase resource utilization and to reduce interference to increase spectral efficiency and reduce energy consumption.

12. The method of claim 11, wherein the mapping modulated symbols to at least the partial resource block comprises mapping modulated symbols to one resource block in the at least one slot.

13. The method of claim 11, wherein the mapping modulated symbols to at least the partial resource block comprises mapping modulated symbols to a first resource block in a first of the at least one slot and a second resource block in a second of the at least one slot.

14. The method of claim 11, wherein the mapping modulated symbols to at least the partial resource block comprises mapping modulated symbols to a first resource block in a first of the at least one slot and a second resource block in the first of the at least one slot.

15. The method of claim 11, wherein the mapping modulated symbols to at least the partial resource block comprises mapping modulated symbols to a plurality of first resource blocks in a first of the at least one slot and a plurality of second resource blocks in a second of the at least one slot.

16. The method of claim 11, wherein the mapping modulated symbols further comprises:
  receiving data at a code block arranged to produce bits of encoded data,
  receiving the encoded data at a modulator arranged to modulate the encoded data to generate modulated symbols, and
  mapping, by a coverage boosting resource unit mapper, the modulated symbols to sub-carriers and symbols in the at least the partial resource block,
  wherein modulating the encoded data comprises modulating the encoded data using code division multiple access.

17. The method of claim 11, wherein the mapping modulated symbols to the at least partial resource block further comprises mapping the modulated symbols to $N_{sc}$ sub-carriers, each subcarrier comprising $N_{symb}$ symbols.

18. The method of claim 11, wherein the mapping modulated symbols to the at least partial resource block to form the coverage boosting resource unit further includes forming narrow bandwidth device regions (NBDRs) to allow operation of narrow bandwidth machine type communication (MTC) terminals in a wide bandwidth system.

19. The method of claim 11, wherein the mapping the modulated symbols to the at least partial resource block to form the coverage boosting resource unit comprises mapping the modulated symbols to the at least partial resource block to form a plurality of coverage boosting resource units spanning $N_{SF}$ sub-frames over $N_F$ frames to form one allocation for transmission of one information message.

20. The method of claim 11, wherein the mapping modulated symbols to the at least partial resource block to form the coverage boosting resource unit further includes forming a preconfigured reference signal arranged to perform channel estimation and signal synchronization tasks.

21. At least one non-transitory machine readable medium comprising instructions that, when executed by the machine, cause the machine to perform operations for boosting coverage of wireless signals, the operations comprising:
  configuring, by a processor, resource blocks for a sub-frame for transmitting data in a communication session, wherein the sub-frame includes at least one slot formed by a matrix of sub-carriers in a frequency domain and symbols in a time domain; and
  mapping, by a transceiver under direction of the processor, modulated symbols to at least a partial resource block to form a coverage boosting resource unit, the coverage boosting resource unit spreading at least one data bit over the at least the partial resource block,
  wherein the mapping modulated symbols to at least the partial resource block comprises selecting at least one from a group consisting of:
    mapping modulated symbols to one resource block in the at least one slot; and
    mapping modulated symbols to a first resource block in a first of the at least one slot and a second resource block in a second of the at least one slot; and
    mapping modulated symbols to a first resource block in a first of the at least one slot and a second resource block in the first of the at least one slot; and
    mapping modulated symbols to a plurality of first resource blocks in a first of the at least one slot and a plurality of second resource blocks in a second of the at least one slot.

22. The at least one non-transitory machine readable medium of claim 21, wherein the mapping modulated symbols further comprises:
  receiving data at a code block arranged to produce bits of encoded data,
  receiving the encoded data at a modulator arranged to modulate the encoded data to generate modulated symbols, and
  mapping, by a coverage boosting resource unit mapper, the modulated symbols to sub carriers and symbols in the at least the partial resource block.

23. At least one non-transitory machine readable medium comprising instructions that, when executed by the machine, cause the machine to perform operations for boosting coverage of wireless signals, the operations comprising:
  configuring, by a processor, resource blocks for a sub-frame for transmitting data in a communication session, wherein the sub-frame includes at least one slot formed by a matrix of sub-carriers in a frequency domain and symbols in a time domain; and
  mapping, by a transceiver under direction of the processor, modulated symbols to at least a partial resource block to form a coverage boosting resource unit, the coverage boosting resource unit spreading at least one data bit over the at least the partial resource block,
  wherein the mapping modulated symbols to at least the partial resource block comprises selecting at least one from a group consisting of:

mapping the modulated symbols to $N_{sc}$ sub-carriers, each subcarrier comprising $N_{symb}$ symbols;

forming narrow bandwidth device regions (NBDRs) in the at least partial resource block to allow operation of narrow bandwidth machine type communication (MTC) terminals in a wide bandwidth system;

mapping the modulated symbols to the at least partial resource block to form a plurality of coverage boosting resource units spanning $N_{SF}$ sub-frames over $N_F$ frames to form one allocation for transmission of one information message;

including a preconfigured reference signal arranged to perform channel estimation and signal synchronization tasks; and mapping modulated symbols in a lean carrier that includes a minimized control channel and reference signal overhead to increase resource utilization and to reduce interference to increase spectral efficiency and reduce energy consumption.

\* \* \* \* \*

UNITED STATES PATENT AND TRADEMARK OFFICE
CERTIFICATE OF CORRECTION

PATENT NO. : 9,585,075 B2
APPLICATION NO. : 14/124964
DATED : February 28, 2017
INVENTOR(S) : Khoryaev et al.

Page 1 of 1

It is certified that error appears in the above-identified patent and that said Letters Patent is hereby corrected as shown below:

In the Claims

In Column 16, Line 51, in Claim 22, delete "sub carriers" and insert --sub-carriers-- therefor Signed and Sealed this
First Day of May, 2018

Andrei Iancu
*Director of the United States Patent and Trademark Office*